United States Patent
Liu et al.

(10) Patent No.: US 8,441,500 B2
(45) Date of Patent: May 14, 2013

(54) METHOD AND SYSTEM FOR PROCESSING IMAGE FILES

(75) Inventors: Qing-Hua Liu, Shenzhen (CN); Yong-Hui Xiao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 580 days.

(21) Appl. No.: 12/728,673

(22) Filed: Mar. 22, 2010

(65) Prior Publication Data

US 2011/0141135 A1   Jun. 16, 2011

(30) Foreign Application Priority Data

Dec. 16, 2009 (CN) .......................... 200910311621.0

(51) Int. Cl.
*G09G 5/02* (2006.01)

(52) U.S. Cl.
USPC .......................................................... 345/604

(58) Field of Classification Search ........... 345/589–605
See application file for complete search history.

(56) References Cited

U.S. PATENT DOCUMENTS

| | | | | |
|---|---|---|---|---|
| 4,613,986 A | * | 9/1986 | Ataman et al. | 382/260 |
| 5,014,134 A | * | 5/1991 | Lawton et al. | 382/240 |
| 5,282,152 A | * | 1/1994 | Caviasca et al. | 708/200 |
| 6,850,246 B2 | * | 2/2005 | Hosotani | 345/589 |
| 7,864,189 B2 | * | 1/2011 | Vaughn | 345/589 |
| 7,945,075 B2 | * | 5/2011 | Lu et al. | 382/118 |

* cited by examiner

*Primary Examiner* — Xiao M. Wu
*Assistant Examiner* — Charles Tseng
(74) *Attorney, Agent, or Firm* — Altis Law Group, Inc.

(57) ABSTRACT

A system for processing image files includes a palette module, an image file disposal module, and an image file rebuild module. The palette module defines a plurality of colors. The image file disposal module processes a RGB image, and acquiring RGB values of all pixels of the RGB image. The image file rebuild module converts the RGB image to a new image displayed by the plurality of colors defined by the palette module.

10 Claims, 2 Drawing Sheets

METHOD AND SYSTEM FOR PROCESSING IMAGE FILES

BACKGROUND

1. Technical Field

The present disclosure relates to image processing, and particularly to, a method and system for processing image files for an electronic book reader.

2. Description of Related Art

An e-book (electronic book) is a text file providing the digital media equivalent of a conventional printed book. E-books are usually read on personal computers or smart phones, or on dedicated hardware devices known as e-book readers. An e-book reader is capable of containing a plurality of e-books therein, being more convenient to use than the same books in printed form.

Because the e-book reader is small, a low frequency processor is used to minimize heat generated. However, the low frequency processor can be overtaxed when processing larger files, such as image files. When viewing images, the e-book reader is often slow.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
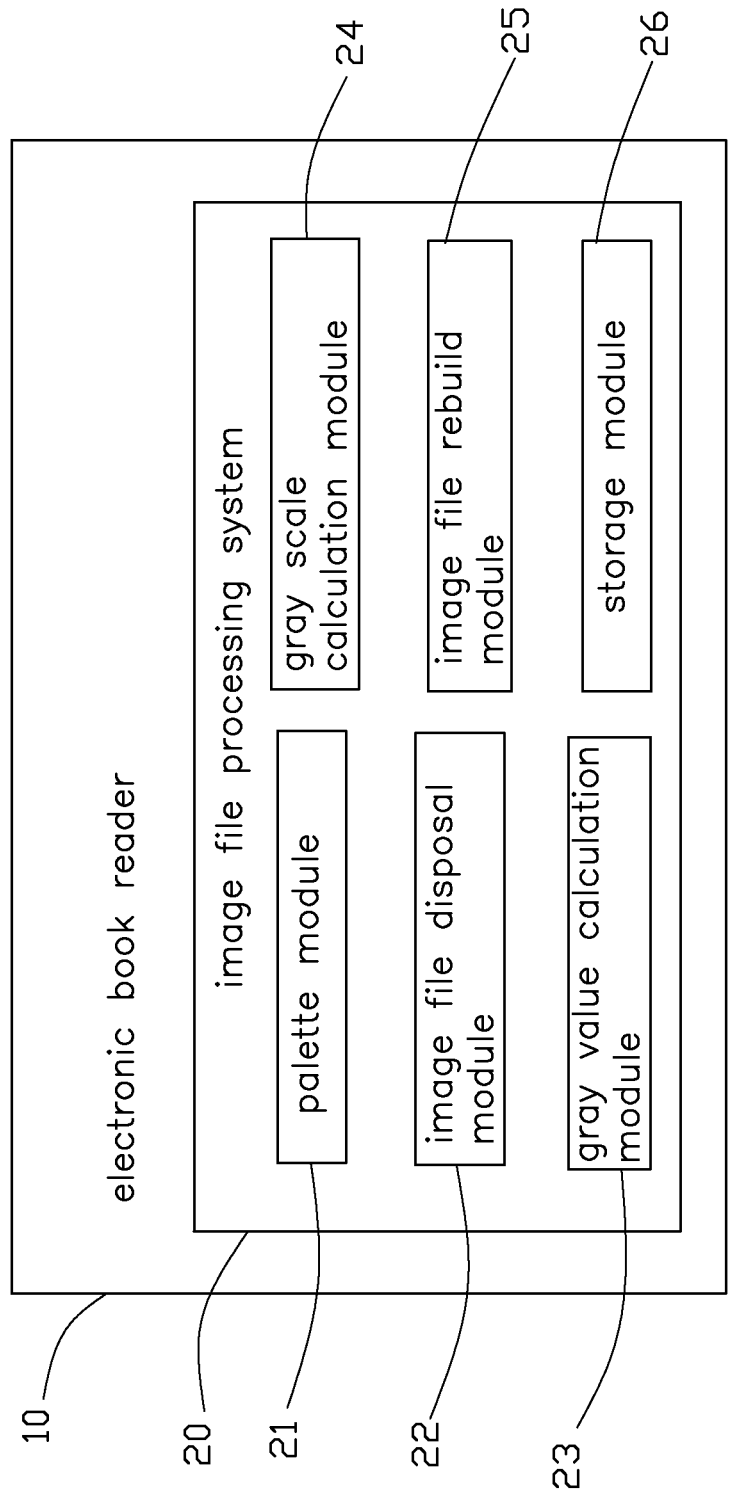
FIG. 1 is a block diagram of a system for processing image files for an e-book reader, according to an embodiment.

Referring to FIG. 1, an image file processing system 20 processes image files for an e-book (electronic book) reader 10. The image file processing system 20 includes a palette module 21, an image file disposal module 22, a gray value calculation module 23, a gray scale calculation module 24, an image file rebuild module 25, and a storage module 26.

The palette module 21 defines colors displayed by the e-book reader 10. In one embodiment, the palette module 21 defines sixteen shades of gray, with gray values set to 0x00, 0x10, 0x20, 0x30, 0x40, 0x50, 0x60, 0x70, 0x80, 0x90, 0xa0, 0xb0, 0xc0, 0xd0, 0xe0, and 0xf0. The palette module 21 further defines a gray scale for the gray value of each of the sixteen shades of gray.

The image file disposal module 22 processes RGB (read, green, and blue) image files stored in the e-book reader 10, and acquires the RGB values of all pixels of the RGB image file. The RGB value of each pixel includes three components, which are R, G, and B. The component R represents a weight of the red color. The component G represents a weight of the green color. The component B represents a weight of the blue color.

The gray value calculation module 23 computes the gray value $g(x, y)$ of each pixel according to the RGB value of the pixel. The $(x, y)$ represents a position of the corresponding pixel. For examples, for an image of 2048*1536 pixels, the $(x, y)$ can be $(1, 1), (1, 2) \ldots (1, 1536) \ldots (2048, 1536)$, etc. In one embodiment, the gray value $g(x, y)$ is equal to $R*0.299+G*0.587+B*0.114$. Therefore, according to the three components R, G, and B of the RGB value, it is easy to compute the gray value $g(x, y)$.

The gray scale calculation module 24 computes gray scale according to the gray value $g(x, y)$. In one embodiment, the gray scale is equal to (int) $g(x, y)/16$.

The image file rebuild module 25 converts the RGB image file to a grayscale image file according to the gray scale of each pixel thereof. In one embodiment, the grayscale image file comprises a string of binary digit. A first and a second digit represent a file type of the grayscale image file. A third to a sixth digit represents a length of the grayscale image file. An eleventh to a fourteenth digit represent the a start position of the image data. A nineteenth and a twentieth digit represent a width of the image. A 23rd and a 24th digit represent a height of the image. A 49th digit represents a total number of colors defined by the palette module 21. A 55th to a 119th digit represent all gray scales defined by the palette module 21. A 120th number and following digit represent the gray scale of all pixels of the image.

The storage module 26 stores the grayscale image file therein.

Figure 2:
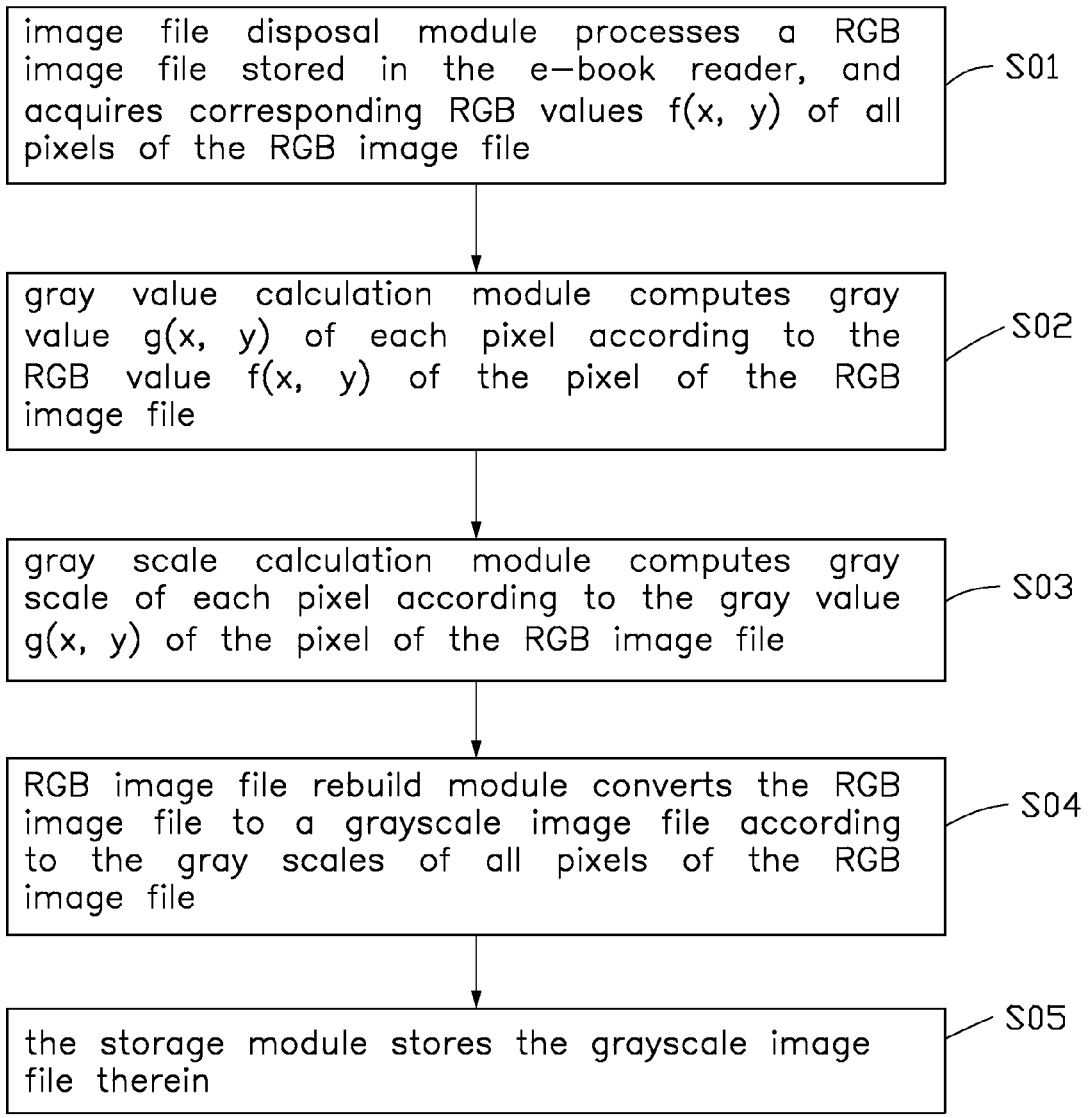
FIG. 2 is a flowchart of a method for processing image files for an e-book reader, according to an embodiment.

Referring to FIG. 2, an embodiment of a method for testing a deflection angle of the lens 32 is shown, as follows.

In step S01, image file disposal module 22 processes a RGB image file stored in the e-book reader 10, and acquires corresponding RGB values $f(x, y)$ of all pixels of the RGB image file.

In step S02, gray value calculation module 23 computes gray value $g(x, y)$ of each pixel according to the RGB value $f(x, y)$ of the pixel of the RGB image file.

In step S03, gray scale calculation module 24 computes gray scale of each pixel according to the gray value $g(x, y)$ of the pixel of the RGB image file.

In step S04, RGB image file rebuild module 25 converts the RGB image file to a grayscale image file according to the gray scales of all pixels of the RGB image file.

In step S05, the storage module 26 stores the grayscale image file therein.

Accordingly, the RGB image file is converted to a grayscale image file. Because the grayscale image file is considerably smaller than the RGB image file, the e-book reader 10 can easily open the grayscale image file, and performance of the e-book reader 10 is improved.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A system for processing image files, comprising:
   a palette module capable of defining a plurality of colors;
   an image file disposal module capable of processing a RGB image, and acquiring RGB values of all pixels of the RGB image; and
   an image file rebuild module capable of converting the RGB image to a new image displayed by the plurality of colors defined by the palette module;
   a storage device that stores the new image therein, the new image comprises a string of binary digits, first and second digits represent a type of the new image, third to sixth digits represent a length of the new image, eleventh to fourteenth digits represent a start position of the new image, nineteenth and twentieth digits represent a width of the new image, 23rd and 24th digits represent a height of the new image, 49th digit represents a total amount of colors defined by the palette module, 55th to 119th digits represent all gray scales defined by the palette module, and 120th and following digits represent the gray scales of all pixels of the new image.

2. The system of claim 1, wherein the plurality of colors comprises different shades of gray, and the palette module defines a gray scale for each shade of gray.

3. The system of claim 2, further comprising a gray value calculation module that is capable of computing gray value of each pixel of the RGB image according to corresponding RGB value of each pixel of the RGB image.

4. The system of claim 3, wherein each RGB value of each pixel of the RGB image comprises a component R representing a weight of red constituent, a component G representing a weight of green constituent, and a component B representing a weight of blue constituent; wherein the gray value calculation module computes a gray value of the pixel with position (x, y) according to R*0.299+G*0.587+B*0.114.

5. The system of claim 3, further comprising a gray scale calculation module, wherein the gray scale calculation module is capable of computing gray scale of each pixel of the RGB image according to the gray value of each pixel of the RGB image.

6. The system of claim 5, wherein the gray scale calculation module is capable of computing the gray scale of each pixel of the RGB image according to the gray vale of the corresponding pixel divided by the number 16.

7. A method for processing image files, comprising:
   processing a RGB image to acquire RGB values of all pixels of the RGB image by an image file disposal module;
   computing a gray value of each pixel of the RGB image according to corresponding RGB value of each pixel of the RGB image by a gray value calculation module; and a gray scale of each pixel of the RGB image according to the gray value of each pixel of the RGB image by a gray scale calculation module;
   converting the RGB image to a grayscale image according to the gray scale of each pixel of the RGB image by an image file rebuild module; and
   storing the grayscale image in a storage device, wherein the grayscale image comprises a string of binary digits, wherein first and second digits represent a type of the new image, third to sixth digits represent a length of the new image, eleventh to fourteenth digits represent a start position of the new image, nineteenth and twentieth digits represent a width of the new image, 23rd and 24th digits represent a height of the new image, 49th digit represents a total amount of colors defined by the palette module, 55th to 119th digits represent all gray scales defined by the palette module, and 120th and following digits represent the gray scales of all pixels of the new image.

8. The method of claim 7, further comprising a step of defining different shades of gray by a palette module before processing the RGB image, wherein the palette module further defines a palette module gray scale for each shade of gray.

9. The method of claim 7, wherein the RGB value of each pixel of the RGB image comprises a component R representing a weight of red constituent, a component G representing a weight of green constituent, and a component B representing a weight of blue constituent; wherein the gray value calculation module computes a gray value of the pixel with position (x, y) according to R*0.299+G*0.587+B*0.114.

10. The method of claim 7, wherein the gray scale calculation module is capable of computing the gray scale of each pixel of the RGB image according to the gray vale of the corresponding pixel divided by the number 16.

* * * * *